United States Patent
Martin et al.

(10) Patent No.: US 9,807,025 B2
(45) Date of Patent: *Oct. 31, 2017

(54) SYSTEM AND METHOD FOR ORDERING OF DATA TRANSFERRED OVER MULTIPLE CHANNELS

(71) Applicant: SILICON GRAPHICS INTERNATIONAL CORP., Milpitas, CA (US)

(72) Inventors: Randal G. Martin, San Jose, CA (US); Steven C. Miller, Livermore, CA (US); Mark D. Stadler, Sunnvale, CA (US); David A. Kruckemyer, Mountain View, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/226,045

(22) Filed: Aug. 2, 2016

(65) Prior Publication Data

US 2016/0344644 A1 Nov. 24, 2016

Related U.S. Application Data

(63) Continuation of application No. 14/635,708, filed on Mar. 2, 2015, now Pat. No. 9,432,299, which is a
(Continued)

(51) Int. Cl.
*H04L 12/801* (2013.01)
*H04L 12/707* (2013.01)
(Continued)

(52) U.S. Cl.
CPC .............. *H04L 47/34* (2013.01); *H04L 45/24* (2013.01); *H04L 47/10* (2013.01); *H04L 47/26* (2013.01);
(Continued)

(58) Field of Classification Search
CPC ......... H04L 47/10; H04L 47/26; H04L 47/34; H04L 47/39; H04L 47/41; H04L 47/266
See application file for complete search history.

(56) References Cited

U.S. PATENT DOCUMENTS

| 4,703,475 | A | 10/1987 | Dretzka et al. |
| 5,222,061 | A | 6/1993 | Doshi et al. |

(Continued)

OTHER PUBLICATIONS

U.S. Appl. No. 09/910,587 Final Office Action dated Oct. 9, 2007.
(Continued)

*Primary Examiner* — Feben M Haile
(74) *Attorney, Agent, or Firm* — Hewlett Packard Enterprise Development Patent Departments

(57) ABSTRACT

A multiple channel data transfer system (10) includes a source (12) that generates data packets with sequence numbers for transfer over multiple request channels (14). Data packets are transferred over the multiple request channels (14) through a network (16) to a destination (18). The destination (18) re-orders the data packets received over the multiple request channels (14) into a proper sequence in response to the sequence numbers to facilitate data processing. The destination (18) provides appropriate reply packets to the source (12) over multiple response channels (20) to control the flow of data packets from the source (12).

14 Claims, 2 Drawing Sheets

Related U.S. Application Data continuation of application No. 12/273,453, filed on Nov. 18, 2008, now Pat. No. 8,971,329, which is a continuation of application No. 09/910,587, filed on Jul. 20, 2001, now Pat. No. 7,453,878.

(60) Provisional application No. 60/219,915, filed on Jul. 21, 2000.

(51) Int. Cl.
  *H04L 12/825* (2013.01)
  *H04L 12/891* (2013.01)

(52) U.S. Cl.
  CPC .......... *H04L 47/266* (2013.01); *H04L 47/39* (2013.01); *H04L 47/41* (2013.01)

(56) References Cited

U.S. PATENT DOCUMENTS

| | | | |
|---|---|---|---|
| 5,754,754 A | 5/1998 | Dudley et al. | |
| 5,825,748 A | 10/1998 | Barkey et al. | |
| 6,021,124 A * | 2/2000 | Haartsen | H04L 1/1822 370/336 |
| 6,044,406 A * | 3/2000 | Barkey | H04Q 11/0478 370/231 |
| 6,072,797 A | 6/2000 | Fletcher | |
| 6,154,794 A | 11/2000 | Abdalla et al. | |
| 6,243,358 B1 | 6/2001 | Monin | |
| 6,246,684 B1 | 6/2001 | Chapman et al. | |
| 6,366,989 B1 | 4/2002 | Keskar et al. | |
| 6,452,901 B1 * | 9/2002 | Yang | H04Q 11/0478 370/231 |
| 6,594,701 B1 | 7/2003 | Forin | |
| 6,788,686 B1 | 9/2004 | Khorimaky et al. | |
| 6,810,428 B1 | 10/2004 | Larsen et al. | |
| 6,944,173 B1 | 9/2005 | Jones et al. | |
| 7,061,929 B1 | 6/2006 | Eberle et al. | |
| 7,269,666 B1 | 9/2007 | Leitner et al. | |
| 7,453,878 B1 | 11/2008 | Martin | |
| 8,971,329 B1 | 3/2015 | Martin | |
| 9,432,299 B2 | 8/2016 | Martin | |
| 2004/0049612 A1 | 3/2004 | Boyd et al. | |
| 2015/0188832 A1 | 7/2015 | Martin | |

OTHER PUBLICATIONS

U.S. Appl. No. 09/910,587 Office Action dated Apr. 20, 2007.
U.S. Appl. No. 09/910,587 Office Action dated Oct. 10, 2006.
U.S. Appl. No. 09/910,587 Final Office Action dated Jun. 21, 2006.
U.S. Appl. No. 09/910,587 Office Action dated Jan. 12, 2006.
U.S. Appl. No. 09/910,587 Final Office Action dated Jul. 18, 2005.
U.S. Appl. No. 09/910,587 Office Action dated Feb. 9, 2005.
U.S. Appl. No. 12/273,453 Final Office Action dated Mar. 27, 2014.
U.S. Appl. No. 12/273,453 Final Office Action dated Sep. 6, 2013.
U.S. Appl. No. 12/273,453 Final Office Action dated Mar. 1, 2013.
U.S. Appl. No. 12/273,453 Office Action dated Jul. 10, 2012.
U.S. Appl. No. 12/273,453 Final Office Action dated Aug. 18, 2011.
U.S. Appl. No. 12/273,453 Office Action dated Mar. 2, 2011.
U.S. Appl. No. 12/273,453 Final Office Action dated Sep. 3, 2010.
U.S. Appl. No. 12/273,453 Office Action dated Feb. 23, 2010.
U.S. Appl. No. 14/635,708 Office Action dated Oct. 7, 2015.

* cited by examiner

SYSTEM AND METHOD FOR ORDERING OF DATA TRANSFERRED OVER MULTIPLE CHANNELS

CROSS-REFERENCE TO RELATED APPLICATIONS

The present application is a continuation and claims the priority benefit of U.S. patent application Ser. No. 14/635,708 filed Mar. 2, 2015, which is a continuation and claims the priority benefit of U.S. patent application Ser. No. 12/273,453 filed Nov. 18, 2008, now U.S. Pat. No. 8,971,329, which is a continuation and claims the priority benefit of U.S. patent application Ser. No. 09/910,587 filed Jul. 20, 2001, now U.S. Pat. No. 7,453,878, which claims the priority benefit of provisional application 60/219,915 filed Jul. 21, 2000, the disclosures of which are incorporated herein by reference.

BACKGROUND

Field of the Invention

The present invention relates in general to computer information processing and more particularly to a system and method for ordering data transferred over multiple channels.

Description of the Related Art

Conventional data transfer schemes may provide flow control for a single channel. However, these schemes do not address the issue of splitting a transfer over multiple physical or virtual channels. In environments where the ordering of the data is important, splitting the data transfer over multiple channels may cause the data to sent in an order different from originally desired. For example, graphics systems may require the 10 processing of data in a certain order to effectively generate an image for display that reflects the intended scene to be viewed. The destination will not be able to effectively process the data since it is received in a different order than when it was generated. Therefore, 15 it is desirable to have a capability to re-order the data at the destination despite the use of multiple channels for data transfer.

SUMMARY OF THE PRESENTLY CLAIMED INVENTION

From the foregoing 1 it may be appreciated by those skilled in the art that a need has arisen for a technique that can re-order data at a destination after the data has been transferred over multiple channels while providing flow control for the data transfer. In accordance with the present invention, a system and method for ordering data transferred over multiple channels are provided that substantially eliminate or lO greatly reduce disadvantages and problems associated with conventional data transfer techniques.

According to an embodiment of the present invention there is provided a method for ordering data transferred over multiple channels that includes generating a data packet in response to a flow control credit. A sequence number is generated and inserted into the data packet. One of a plurality of channels to transfer the data packet is selected and the data packet is transferred over the selected one of the plurality of channels.

The present invention provides various technical advantages over conventional data transfer techniques. For example, one technical advantage is to associate a sequence number to data packets so that they can be placed into the proper sequence at the destination. Another technical advantage is to place data packets received from a source in an appropriate sequence despite transferring the data packets over multiple channels. Yet another technical advantage is to integrate reordering of data packets with flow control of the data packet transfer. Other examples may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction 5 with the accompanying drawings, wherein like reference numerals represent like parts, in which.

DETAILED DESCRIPTION

Figure 1:
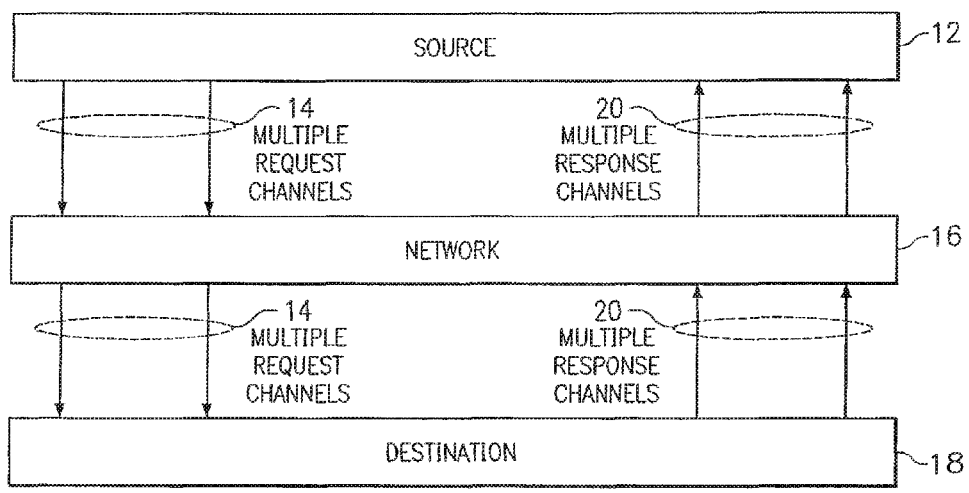
FIG. 1 illustrates a block diagram of a multiple channel data transfer system.

FIG. 1 is a block diagram of a multiple channel data transfer system 10. System 10 includes a source 12 that generates data packets for transfer over multiple request channels 14. Data packets are transferred over multiple request channels 14 through a network 16 to a destination 18. Destination 18 processes the data packets received over multiple request channels 14 and provides appropriate response packets to source 12 over multiple response channels 20 through network 16. In an exemplary scenario, system 10 may be a graphics system wherein source 12 is a node with one or more processors generating data packets and destination 18 is a graphics processor that generates images in response to the data packets. Multiple request channels 14 are needed as the amount of data generated by a processor of the node may exceed the bandwidth of a single channel. Network 16 may be any data transfer medium that may include one or more of a local area network, wide area network, Ethernet network, Internet, or any conventional network for transferring data.

Each data packet generated at source 12 may be placed onto any available one of the multiple request channels 14. For each data packet, source 12 determines an available channel according to capacity and flow control instructions. Examples of flow control implementations in single channel systems can be found in co-pending U.S. application Ser. No. 09/409,805 and U.S. Pat. No. 6,154,794, which are each hereby incorporated by reference herein. In a multi-channel implementation, a first packet may be sent on a first channel and a second packet may be sent on another channel. Because data packets may be sent on different channels, destination 18 may receive and buffer the second packet before the first packet even though the first packet was generated prior to generation of the second packet. Since the processing of data packets in the correct order is important, destination 18 needs to recognize that the first packet is to be processed before the second packet.

Figure 2:
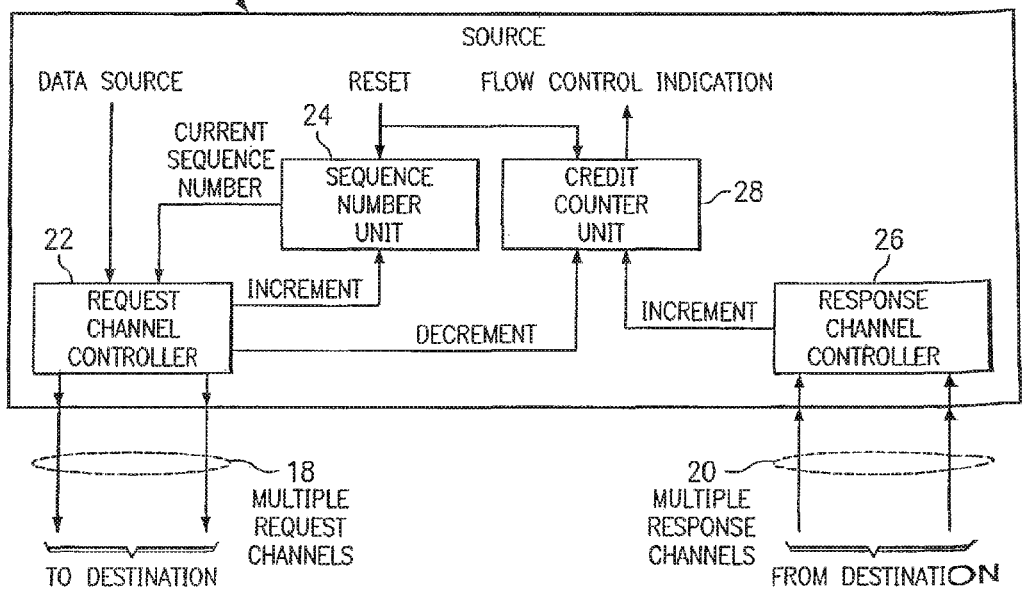
FIG. 2 illustrates a block diagram of a source for IO data packet generation in the multiple channel data transfer system.

FIG. 2 shows a block diagram for the generation of data packets at source 12. Source 12 includes a source request channel controller 221 a sequence number unit 24, a response channel controller 26, and a credit counter unit 28. Source request channel controller 22 generates data packets from data received from a data source, such as a processor, in source 12 and selects among multiple request channels for the transferring of the data packets. Alternatively, the data source may provide the data in packet form for transfer by source request channel controller 22.

Source request channel controller 22 inserts a sequence number as provided by sequence number unit 24 for each generated data packet. The sequence number is used by destination 18 in order to re-order the received data packets into the proper sequence. sequence number into a data packet, Upon inserting a source request channel controller 22 transfers the data packet onto a selected one of multiple request channels 14. Source request channel controller 22 issues an increment command to sequence number unit 24 so that the current sequence number provided by sequence number unit 24 to source request channel controller 22 is advanced to the next number in the sequence. The sequence number may be reset by the data source for each block of data to be transferred.

Source request channel controller 22 also issues a decrement command to credit counter unit 28 to indicate that a credit was used in transferring the data packet over the selected one of the multiple request channels 14. Credit counter unit 28 is initialized with a number of credits by a reset signal from the data source. The number of credits is decremented after transfer of each data packet from source request channel controller 22. Credit counter unit 28 provides a flow control indication to the data source to control the amount of data provided by the data source. As long as the number of credits is above a desired threshold value, the flow control indication informs the data source that it may continue to provide data. If the number of credits falls below the desired threshold value, the flow control indication informs the data source to cease providing data until the desired threshold value is again exceeded. The data source may force an interrupt to do a context switch in order that other tasks may be performed in the event that the flow control indication maintains the data cessation status for a certain period of time. The data source will then return to the transfer of data packets. The 25 number of credits is incremented in response to response channel controller 26 receiving a reply from destination 18 over one of multiple response channels 20. The reply includes a credit indicating that destination 18 has processed a data packet and has capability to receive 30 another data packet.

Figure 3:
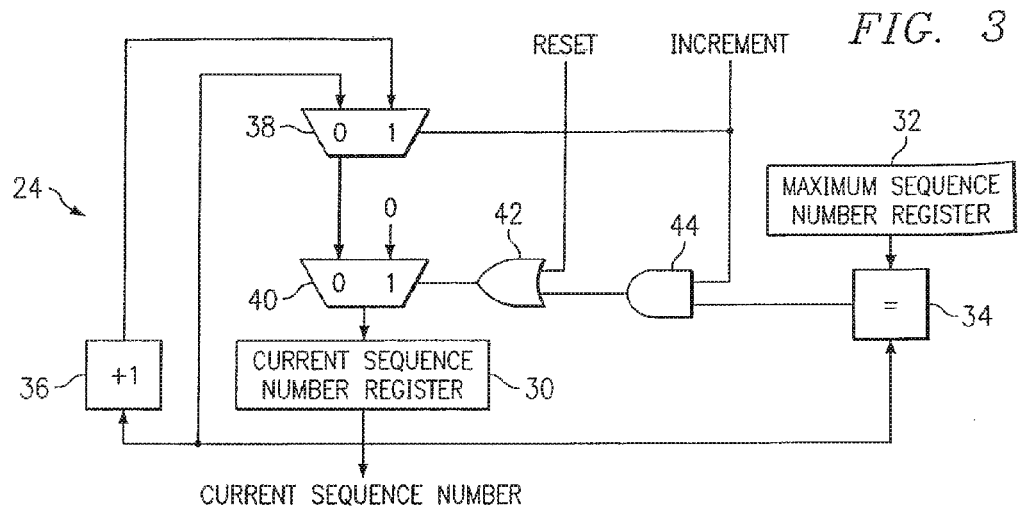
FIG. 3 illustrates a block diagram of a sequence number unit in the source.

FIG. 3 shows a block diagram of sequence number unit 24. Sequence number unit 24 includes a current sequence number register 30, a maximum sequence number register 32, comparator 34, increment unit 36, increment selectors 38 and 40, reset logic 42, and increment logic 44. Upon initialization, a reset signal from the data source causes a sequence number value of zero to be loaded into current sequence number register 30. Increment selector 38 receives the value in current sequence number register 30 and an incremented sequence number value from increment unit 36. Increment counter 38 provides the value from current sequence number register 30 to increment selector 40 unless an increment signal has been received from source request channel controller 22 indicating that a data packet with the value in current sequence number register 30 has been transferred. Increment selector 40 provides the value in current sequence number register 30 back thereto unless a reset signal is received from the data source or an increment signal is received from source request channel controller 22. The reset signal causes the zero value to be loaded into current sequence number register 30. The increment signal causes an incremented value to flow through increment selectors 38 and 40 for loading into current sequence number register 30.

Current sequence number register 30 may also be loaded with the zero value according to a maximum value in maximum sequence number register 32. The value in current sequence number register 30 is compared to the value in maximum sequence number register 32 at comparator 34. If these values are equal, comparator 34, 30 through increment logic 44 and reset logic 42, causes the zero value at increment selector 40 to be loaded into current sequence number register 30. In this manner, a large data packet group may be accommodated without loss of packet ordering since sequence numbers will be freed up and available for re-use once a data packet has been processed. Current sequence number register 30 and maximum sequence number register 32 may be programmable to provide a range of sequence numbers to simplify buffering at destination 18. Also, the programmable nature of these registers allows for varying the size of buffers receiving data packets at destination 18.

Figure 4:
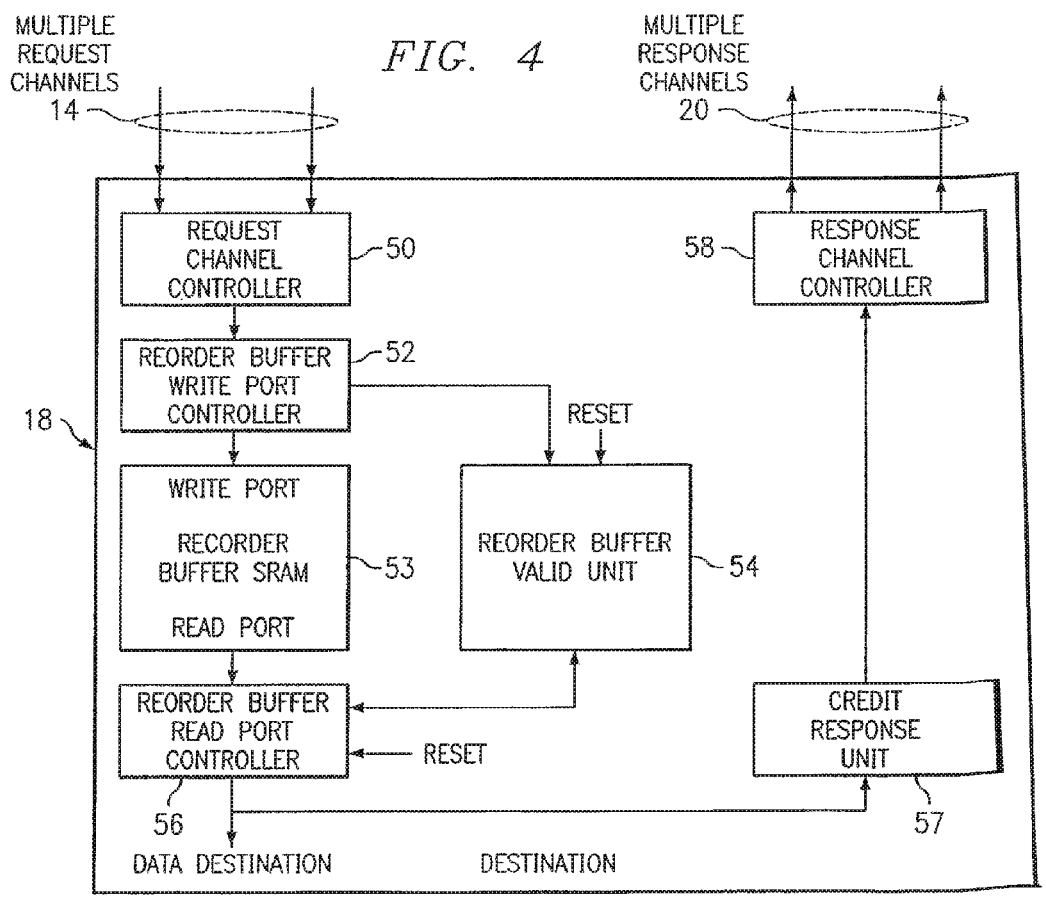
FIG. 4 illustrates a block diagram of a 15 destination for processing data packets in the multiple channel data transfer system.

FIG. 4 shows the processing performed at destination 18. Destination 18 includes a destination request channel controller 50, a re-order buffer write port controller 52, a re-order buffer 53, a re-order buffer valid bit unit 54, a re-order buffer read port controller 56, a credit response unit 57, and a destination response channel controller 58. In operation, destination request channel controller 50 receives data packets from source 12 over multiple request channels 14. Destination request channel 20 controller 50 provides the data packets to a re-order buffer write port controller 52. Ordering of data packets is not guaranteed over multiple request channels 14. To regain the proper ordering of the data packets, re-order buffer write port controller 52 uses the sequence numbers in the data packets to directly index into re-order buffer 53 through its write port. Re-order buffer valid bit unit 54 maintains a valid bit for each portion of re-order buffer 53. When re-order buffer write port controller 52 causes data packets to be stored 30 in re-order buffer 53, a corresponding valid bit is set. Re-order buffer read port controller 56 monitors the valid bits. When a next sequential valid bit is set, the data packets associated with the immediately preceding valid bit in the corresponding portion of re-order buffer 53 are read from its read port and provided to a data destination. Once the data packets have been read from re-order buffer 53, the corresponding valid bit is cleared. All valid bits may be cleared in response to a reset signal. Through use of the sequence numbers, data packets are read from re-order buffer 53 in their original order of generation. As packets are read from re-order buffer 53, credit response unit 57 returns flow control credits back to source 12 through destination response channel controller 58 over multiple response channels 20.

Thus, it is apparent that there has been provided, in accordance with the present invention, a system and method for ordering data transferred over multiple channels that satisfies the advantages set forth above. Although the present invention has been described in detail, it should be understood that various changes, substitutions, and alterations may be made herein. For example, the functionality for providing sequence numbers and flow control credits may be performed in any number of ways other than the implementation described above for appropriate sequence number and credit processing. Other examples may be readily ascertainable by those skilled in the art and may be made herein without departing from the spirit and scope of the present invention as defined by the following claims.

What is claimed is:

1. A method for transferring data over multiple channels, the method comprising:
receiving a plurality of data packets over a plurality of request channels from a first computing device, wherein at least some of the plurality of received packets are received out-of-order;
storing each of the received data packets of the plurality of data packets in a re-order buffer;
setting one or more bits, wherein each of the one or more bits set identify that at least a portion of the re-order buffer contains valid packet data, wherein:
a first bit of the one or more bits set include a packet valid bit for each of the received data packets,
the one or more bits set include a next sequential valid bit,
the next sequential valid bit associated with an immediately preceding valid bit that corresponds to at least an immediately preceding portion of the re-order buffer, and
at least one packet of the received packets stored in the re-order buffer is provided to the destination based on the immediately preceding valid bit being set;
transmitting a response for each of the received data packets over one or more response channels; and
providing the one or more of the received data packets to a data destination in-order based on the one or more bit settings.

2. The method of claim 1, wherein at least one bit of the one or more bits set are cleared as each of the one or more packets are provided to the data destination.

3. The method of claim 1, wherein a value associated with a received packet count is incremented as each packet of the plurality of data packets are received over the plurality of request channels.

4. The method of claim 3, wherein:
the value associated with the received packet count is stored in a first logic register,
a maximum sequence count is stored in a second logic register,
values in the first logic register and the second logic register are compared;
a sequence number value is prepared based on the comparison of the values in the first logic register and the second logic register; and
the prepared sequence number is provided to the first logic register based on the comparison of the values in the first logic register and the second logic register.

5. The method of claim 1, wherein:
a credit counter in initialized with a number of credits;
one or more packets of the plurality of data packets are transmitted from the first computing device over the plurality of request channels;
the credit counter is adjusted in a first direction after the one or more packets are transmitted;
an indication is sent to the first computing device indicating that the credit counter has crossed below a threshold value,
the indication causes the first computing device to stop transmitting the packet data,
a second indication is sent to the first computing device, the second indication identifying that the credit counter has crossed above the threshold value, and
the second indication causes the first computing device to send additional packet data.

6. A non-transitory computer readable storage medium having embodied thereon a program executable by a processor to perform a method for transferring data over multiple channels, the method comprising:
receiving a plurality of data packets over a plurality of request channels from a first computing device, wherein at least some of the plurality of received packets are received out-of-order;
storing each of the received data packets of the plurality of data packets in a re-order buffer;
setting one or more bits, wherein each of the one or more bits set identify that at least a portion of the re-order buffer contains valid packet data, wherein
a first bit of the one or more bits set include a packet valid bit for each of the received data packets,
the one or more bits set include a next sequential valid bit,
the next sequential valid bit associated with an immediately preceding valid bit that corresponds to at least an immediately preceding portion of the re-order buffer, and
at least one packet of the received packets stored in the re-order buffer is provided to the destination based on the immediately preceding valid bit being set;
transmitting a response for each of the received data packets over one or more response channels; and
providing the one or more of the received data packets to a data destination in-order based on the one or more bit settings.

7. The non-transitory computer readable storage medium of claim 6, wherein at least one bit of the one or more bits set are cleared as each of the one or more packets are provided to the data destination.

8. The non-transitory computer readable storage medium of claim 6, wherein a value associated with a received packet count is incremented as each packet of the plurality of data packets are received over the plurality of request channels.

9. The non-transitory computer readable storage medium of claim 8, wherein:
the value associated with the received packet count is stored in a first logic register,
a maximum sequence count is stored in a second logic register,
values in the first logic register and the second logic register are compared;
a sequence number value is prepared based on the comparison of the values in the first logic register and the second logic register; and
the prepared sequence number is provided to the first logic register based on the comparison of the values in the first logic register and the second logic register.

10. The non-transitory computer readable storage medium of claim 6, wherein:
a credit counter in initialized with a number of credits;
one or more packets of the plurality of data packets are transmitted from the first computing device over the plurality of request channels;
the credit counter is adjusted in a first direction after the one or more packets are transmitted;
an indication is sent to the first computing device indicating that the credit counter has crossed below a threshold value,
the indication causes the first computing device to stop transmitting the packet data,
a second indication is sent to the first computing device, the second indication identifying that the credit counter has crossed above the threshold value, and the second indication causes the first computing device to send additional packet data.

11. A system for transferring data over multiple channels, the apparatus comprising:
a first computing device;
a second computing device;
a plurality of request channels; and
one or more response channels, wherein:
receiving a plurality of data packets are received by the second computing device, wherein the plurality of packets are transmitted from a first computing device to the second computing device over the plurality of request channels, and at least some of the plurality of received packets are received out-of-order;
each of the received data packets of the plurality of data packets are stored in a re-order buffer;
one or more bits are set,
a first bit of the one or more bits set include a packet valid bit for each of the received data packets,
the one or more bits set include a next sequential valid bit,
the next sequential valid bit associated with an immediately preceding valid bit that corresponds to at least an immediately preceding portion of the re-order buffer, and
at least one packet of the received packets stored in the re-order buffer is provided to the destination based on the immediately preceding valid bit being set;
each of the one or more bits set identify that at least a portion of the re-order buffer contains valid packet data,
a response for each of the received data packets are transmitted over one or more response channels, and
the one or more of the received data packets are provided to a data destination in-order based on the one or more bit settings.

12. The system of claim 11, wherein at least one bit of the one or more bits set are cleared as each of the one or more packets are provided to the data destination.

13. The system of claim 11, wherein a value associated with a received packet count is incremented as each packet of the plurality of data packets are received over the plurality of request channels.

14. The system of claim 13, wherein:
the value associated with the received packet count is stored in a first logic register,
a maximum sequence count is stored in a second logic register,
values in the first logic register and the second logic register are compared;
a sequence number value is prepared based on the comparison of the values in the first logic register and the second logic register; and
the prepared sequence number is provided to the first logic register based on the comparison of the values in the first logic register and the second logic register.

* * * * *